Oct. 20, 1936.   O. DUDA   2,057,886
BALANCED THROTTLE VALVE
Filed July 19, 1935
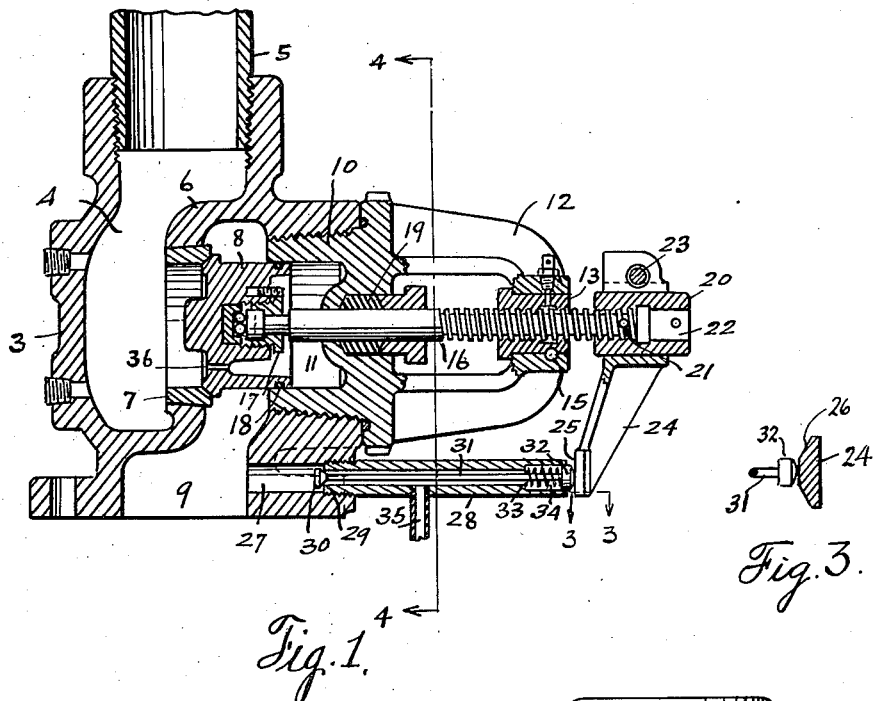
Fig. 1.
Fig. 3.
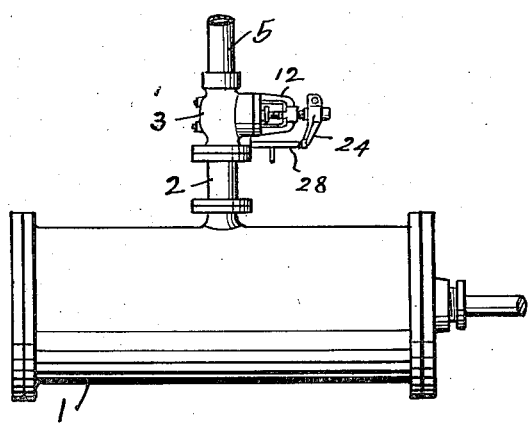
Fig. 2.
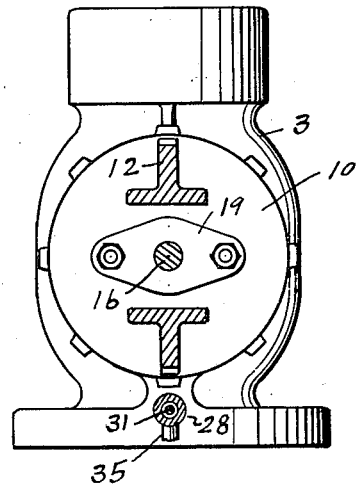
Fig. 4.
Inventor
Oswald Duda
By Hardway Mather
Attorneys Patented Oct. 20, 1936

2,057,886

UNITED STATES PATENT OFFICE 2,057,886

BALANCED THROTTLE VALVE

Oswald Duda, Corsicana, Tex.

Application July 19, 1935, Serial No. 32,154

1 Claim. (Cl. 277—14)

This invention relates to a balanced throttle valve.

An object of the invention is to provide a valve of the character described for controlling the application of an operating fluid to a steam engine, or other motor adapted to be driven by fluid under pressure.

Engines or motors driven by steam or similar operating fluid usually include exposed movable parts, and with the conventional throttle valve in common use, when the valve is closed, the operating fluid sometimes leaks past the valve, or the motive fluid trapped in the engine cylinder behind the piston may expand and in either event the motor may be operated unintentionally for a time causing the exposed parts, such as the crankshaft or flywheel, to move and injure workmen about the motor.

It is the prime object of this invention to provide a throttle valve mechanism whereby the fluid so trapped, or the fluid leaking past the closed valve, will be relieved so that there will be no movement of the operated parts of the engine or motor after the throttle valve has been closed.

With the above and other objects in view, the invention has particular relation to certain novel features of construction, operation, and arrangement of parts, an example of which is given in this specification and illustrated in the accompanying drawing, wherein:—

Fig. 1 shows an enlarged, sectional view of the balanced throttle valve.

Fig. 2 shows a side elevation of an engine cylinder, showing the valve connected thereto.

Fig. 3 shows a cross-sectional view taken on the line 3—3 of Fig. 1, and

Fig. 4 shows a cross-sectional view taken on the line 4—4 of Fig. 1.

In the drawing the numeral 1 designates the cylinder of an engine, or motor, having an intake pipe 2 to which the valve body 3 is connected. In the valve body there is the steam chest 4 into which the pipe 5 leads from a suitable source of pressure fluid such as steam. The valve body has the partition 6 therethrough in which there is located the annular valve seat 7, the passageway through which is controlled by the valve 8. The steam passing from the chest 4 through the valve seat passes into the receiving chamber 9 and thence to the engine.

Screwed into the valve body 3 opposite the steam chest 4 there is a gland 10 having the cylinder 11 in which the valve 8 is slidably mounted.

A yoke 12 is mounted on the gland 10 and preferably formed integrally therewith.

Mounted in the outer end of the yoke there is a nut 13 which is pinned against rotation by the pin 15. A valve stem 16 has its inner end connected to the valve and secured thereto by the retainer 17 so as to permit the stem to swivel relative to the valve.

The outer end of the stem is coarsely threaded through the nut 13. The valve 8 is in the form of a piston and has the surrounding piston ring 18, forming a fluid-tight joint with the wall of the cylinder 11. The valve rod 16 works through a suitable stuffing box 19 in the outer end of the gland 10.

It is obvious that when the stem 16 is turned in one direction, the valve will be moved to closed position as shown in Fig. 1, and when turned in the other direction, the valve will be retracted to open position to admit the operating fluid to the engine.

Fastened on the outer end of the stem there is a coupling 20 which is suitably pinned thereon by the coupling pin 21 and the outer end of the coupling has a square socket 22 to receive a wrench by means of which the valve stem may be turned.

Clamped on the coupling by a suitable clamp bolt, as 23, there is the arm 24 whose outer end has the bearing face 25 which is beveled each way, as at 26.

Leading out from the receiving chamber 9, there is a channel 27, and a relief valve assembly is screwed into the outer end of this channel. This assembly comprises the tubular housing 28 whose inner end is formed into a valve seat 29 with which the inwardly opening valve 30 cooperates. This valve is attached to the inner end of the stem 31 whose outer end has the exposed head 32, and surrounding said stem 31 and interposed between said head and shoulder 33 in the housing, there is a coil spring 34 which normally holds the valve 30 closed. The housing 28 has a relief outlet 35 located out beyond the valve 30.

When the stem 16 is actuated to close the valve 8, the outer end of the arm 24 will ride upon the head 32 and this will operate to open the valve 30 so that the steam trapped in the receiver 9, or the steam leaking past the valve 8 into said receiver may freely pass outwardly and be discharged through the outlet 35 so that there will be no danger of moving parts of the engine being operated or moved when the valve 8 is closed.

The stem 24 may be suitably adjusted to perform the purposes indicated.

It may be noted that the valve 8 has a port 36 through which the pressure of the steam in the cylinder 11 and the chest 4 may be equalized to conduce to the easy operation of the valve 8.

The drawing and description disclose what is now considered to be a preferred form of the invention by way of illustration only, while the broad principle of the invention will be defined by the appended claim.

What I claim is:

A valve mechanism having a main valve and receiving chamber for operating fluid provided with a relief channel, a relief valve assembly comprising a tubular housing, one end of which communicates with said channel and is formed into a valve seat and whose opposite end is enlarged internally and provided with an inside shoulder, an inwardly opening valve arranged to cooperate with said seat, a stem attached to said valve and extended through the housing and whose outer end has an exposed, enlarged head, a coil spring around the stem between the head and shoulder and enclosed by the housing and arranged to normally hold the valve closed, said housing having a relief outlet, valve actuating means including a rotatable valve stem and a rotating arm adjustably mounted on the main valve stem and provided with a wedge-shaped face arranged to contact with said head to actuate the relief valve to open position.

OSWALD DUDA.